(12) United States Patent  (10) Patent No.: US 7,604,171 B2
Chang  (45) Date of Patent: Oct. 20, 2009

(54) OPTICAL READING HEAD OF SCANNING APPARATUS

(76) Inventor: Yu-Cheng Chang, No. 669, Ruey Kuang Road, Taipei (TW) 114

( * ) Notice: Subject to any disclaimer, the term of this patent is extended or adjusted under 35 U.S.C. 154(b) by 557 days.

(21) Appl. No.: 11/235,812

(22) Filed: Sep. 27, 2005

(65) Prior Publication Data

US 2007/0051810 A1    Mar. 8, 2007

(30) Foreign Application Priority Data

Sep. 2, 2005   (TW) ............................... 94130037 A

(51) Int. Cl.
*G06K 7/10* (2006.01)
(52) U.S. Cl. ...................... 235/454; 358/474
(58) Field of Classification Search ................. 235/454; 358/461, 474, 488, 497, 498; 359/204, 205
See application file for complete search history.

(56) References Cited

U.S. PATENT DOCUMENTS

2004/0182985 A1   9/2004  Hong
2005/0133599 A1*  6/2005  Qian et al. .................. 235/454
2006/0114365 A1   6/2006  Takahashi
2006/0187498 A1*  8/2006  Ying et al. .................. 358/474

FOREIGN PATENT DOCUMENTS

| JP | 62217219   | 9/1987 |
| JP | 1142912    | 6/1989 |
| JP | 4242207 A  | 8/1992 |
| JP | 05030293   | 2/1993 |
| JP | 9168078 A  | 6/1997 |
| JP | 10257237 A | 9/1998 |
| TW | 570448     | 1/2004 |

* cited by examiner

*Primary Examiner*—Daniel A Hess
(74) *Attorney, Agent, or Firm*—Workman Nydegger

(57) ABSTRACT

An optical reading head of a scanning apparatus includes a casing, a lens, a base and a sliding frame. The base is used to support an image sensing module and movable on the casing. The sliding frame is coupled with the base for fixing and driving the lens to move along a gliding track on the casing. During the focusing operation, the lens' position is adjustable by moving the sliding frame and the optical signals are clearly imaged onto the image sensor of the imaging sensing module. During the magnification correcting operation, positions of the lens and the imaging sensing module are adjustable by moving the base and the tolerance of magnification for the optical reading head would be equal to or less than an acceptable preset value.

36 Claims, 18 Drawing Sheets

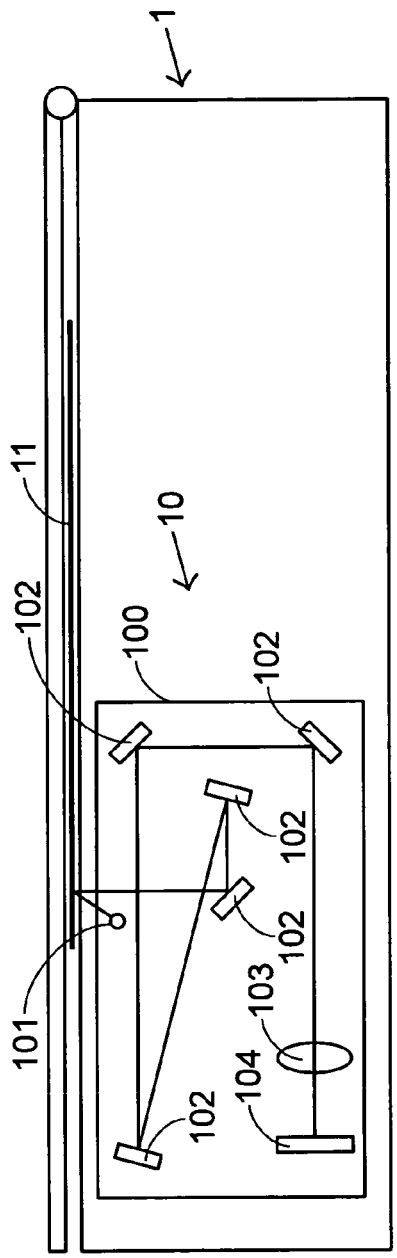
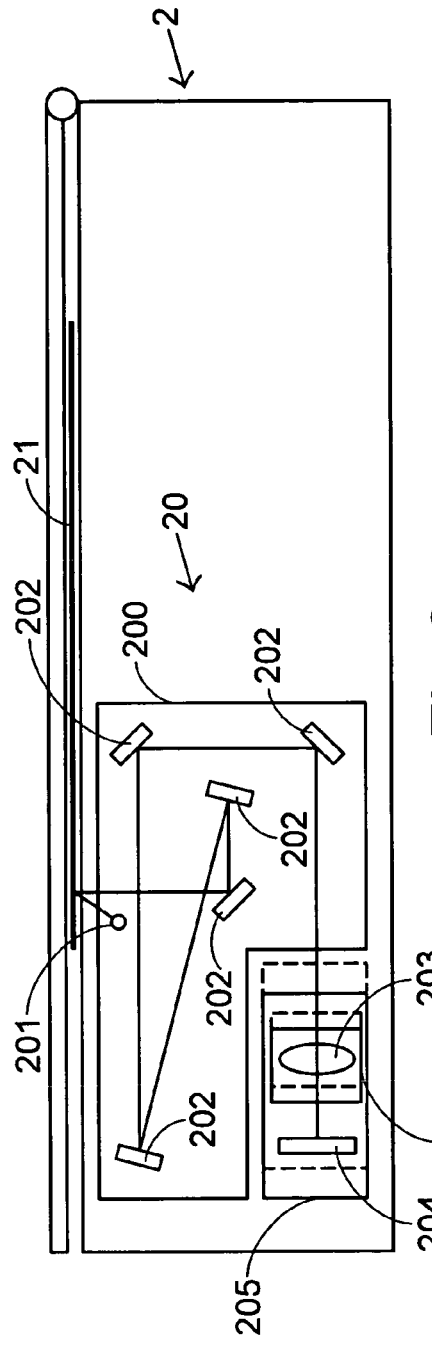
Fig.1
(Prior Art)
Fig.2

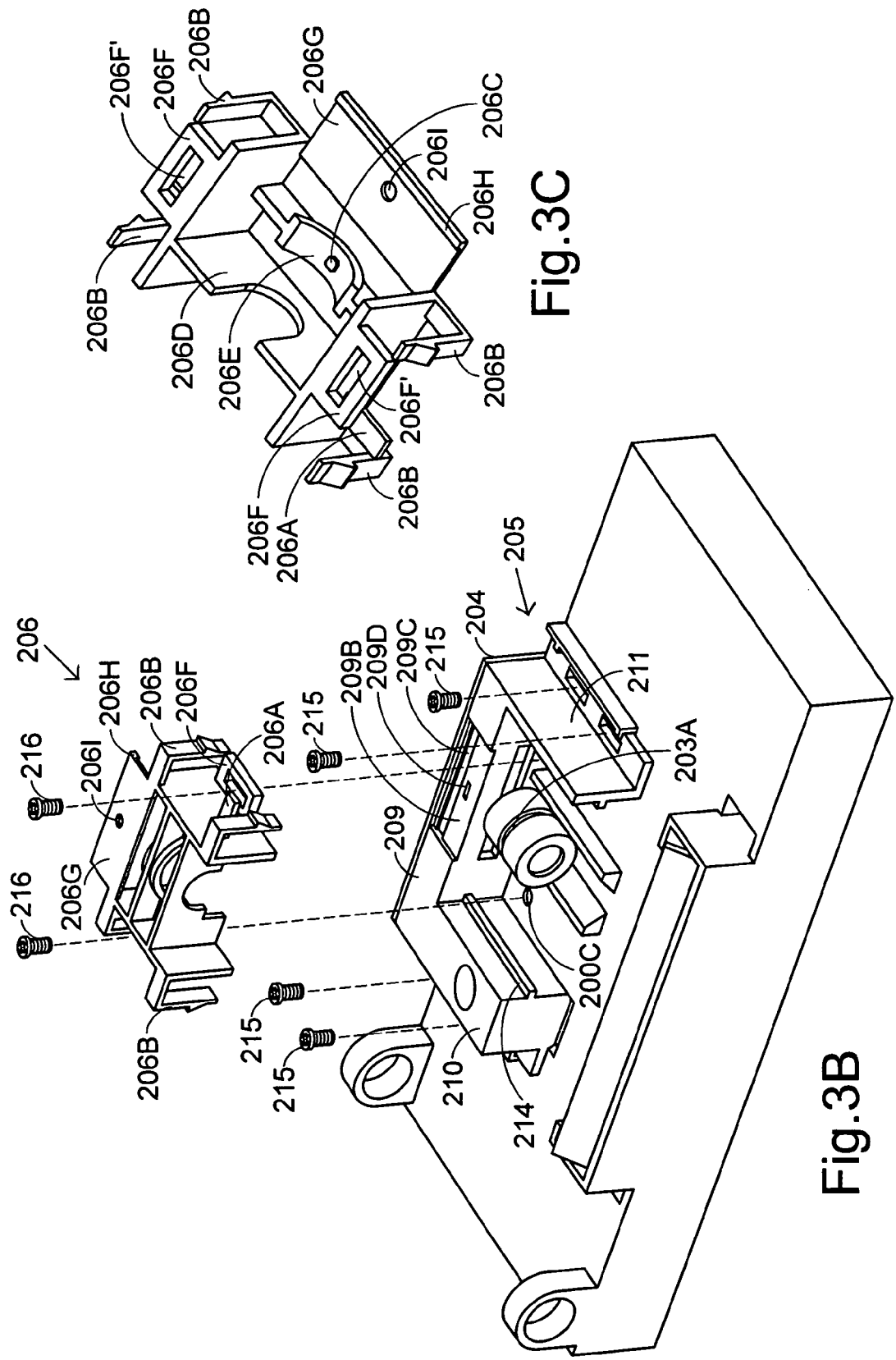

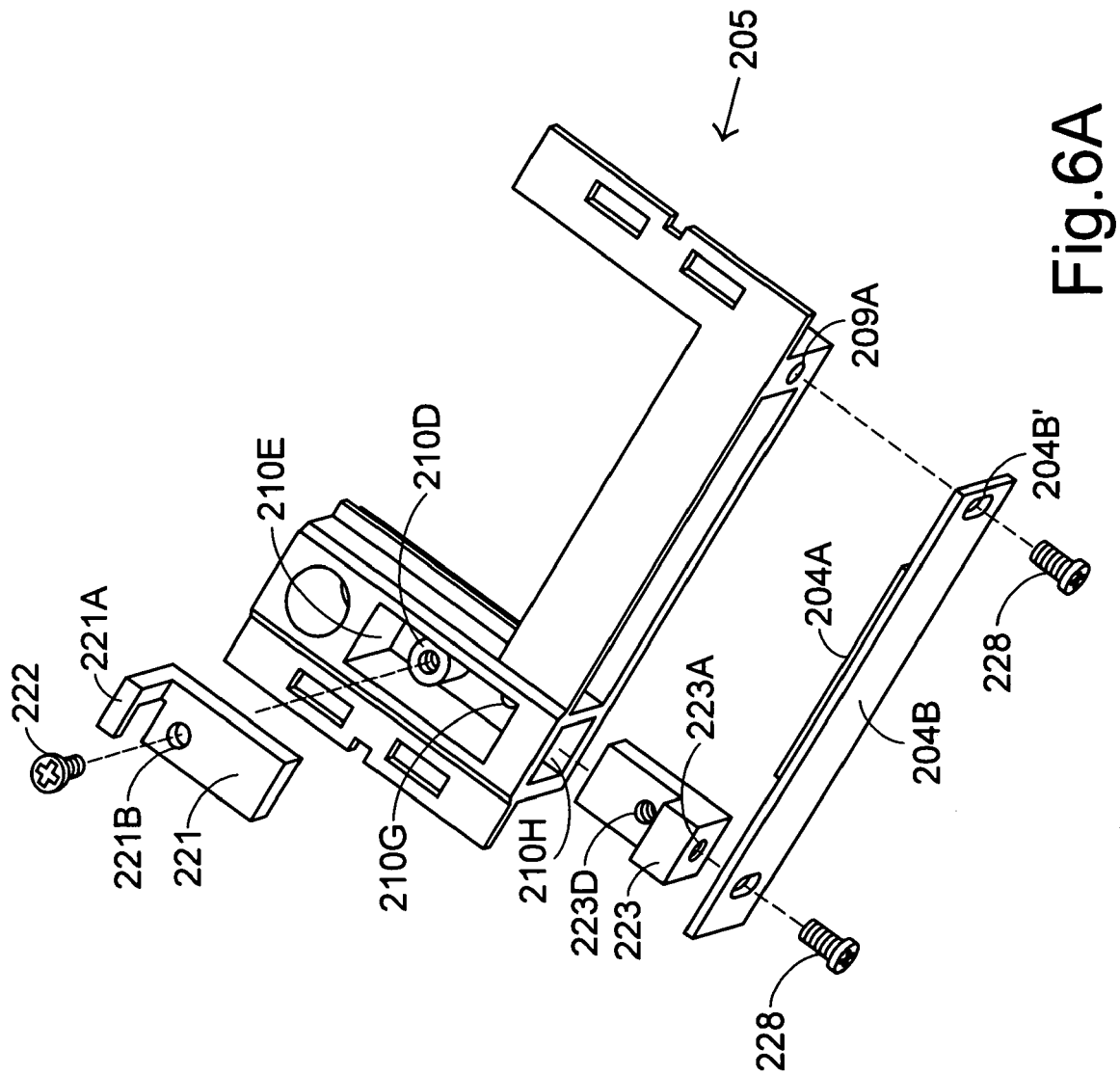

OPTICAL READING HEAD OF SCANNING APPARATUS

FIELD OF THE INVENTION

The present invention relates to an optical reading head of a scanning apparatus, and more particularly to an optical reading head having a sliding frame and a base for facilitating the assembler to perform focusing and magnification correcting operations.

BACKGROUND OF THE INVENTION

Referring to FIG. 1, a schematic cross-sectional view of an optical reading head of a conventional scanning apparatus 1 is illustrated. The optical reading head 10 comprises a light source 101, plural reflective mirrors 102, a lens 103 and an image sensing module 104 are provided. During operation, the light emitted from the light source 101 is projected onto a document 11 to be scanned. The light reflected from the scanned document 11 is successively reflected by the plural reflective mirrors 102, and then focused by the lens 103. The focused light is then imaged onto an image sensor (not shown) of the image sensing module 104 to convert the optical signals into analog electrical signals. The light source 101, the reflective mirrors 102, the lens 103 and the image sensing module 104 are included within a casing 100. The casing 100 of the optical reading head 10 is driven by a driving device (not shown) so as to scan the whole document 11.

Please refer to FIG. 1 again. After the light source 101, the mirrors 102, the lens 103 and the image sensing module 104 are mounted within the casing 100 of the optical reading head 10, focusing and magnification correcting operations should be performed. At first, by properly adjusting the position of the lens 103, the optical signals would be clearly imaged onto the image sensor. Afterward, by simultaneously moving the lens 103 and the image sensing module 104, the tolerance of magnification for the optical reading head 10 would be equal to or less than an acceptable preset value. Generally, during the process of performing the focusing and magnification correcting operations, the lens 103 and the image sensing module 104 are firstly arranged on a base, and then the base is mounted on the casing 100. Under this circumstance, the assembler may correct the magnifying power of the optical reading head 10 by moving the lens 103 on the base to image the optical signals onto the image sensor. Then, by adjusting the location of the base, the lens 103 and the image sensing module 104 are simultaneously moved, thereby performing the magnification correcting operation.

An example of the above optical reading head is described for example in Taiwanese Patent No. 417931, entitled "Optical path adjustable mechanism of an optical system". In such an optical path adjustable mechanism, a lens and an image sensing module are mounted on a base. The assembler may correct the magnifying power of the optical reading head by moving the lens on the base so as to image the optical signals onto the image sensor. Alternatively, by adjusting the location of the base, the lens and the image sensing module are simultaneously moved, and thus the magnifying power of the optical reading head is also corrected.

As previously described, the lens is moved on the base to perform the focusing operation of the image sensor and then the base is moved to perform the magnification correcting operation. This optical path adjustable mechanism, however, has some drawbacks. For example, since the lens is indirectly moved on the casing via the base to perform the focusing and magnification correcting operations, the accumulated tolerance of the optical reading head is increased, and thus the scanning performance is reduced.

On the other hand, it is important to stably move the base on the casing during the process of performing the magnification correcting operation. In accordance with the optical reading head described in Taiwanese Patent No. 417931, a resilient clip element is disposed on a side of the base such that the opposite side of the base is in close contact with the gliding pedestal. Under this circumstance, the base is advanced in close to bilateral sides of the gliding pedestal. Unfortunately, since the pushing force applied by the resilient element sheet is perpendicular to the advancing direction, the base is readily sloped rightwards or leftwards and fails to be stably moved along the gliding pedestal.

Moreover, after the focusing and magnification correcting operations are completed, the lens is glued onto the base so as to fix the position of the lens. Once the optical reading head needs be maintained and reworked and the lens needs to be replaced, the combination of the lens and the base would be replaced by a new one. Therefore, there is a need for developing an improved base capable of fixing a lens thereon and is easily detachable when the optical reading head is maintained and reworked and the lens needs to be replaced.

SUMMARY OF THE INVENTION

As previously described, in the optical reading head of the conventional scanning apparatus, the lens is mounted on the base. Since the lens is indirectly moved on the casing via the base to perform the focusing and magnification correcting operations, the accumulated tolerance of the optical reading head is increased.

In views of the above-described disadvantages of the prior art, the applicant keeps on carving unflaggingly to develop an optical reading head of a scanning apparatus according to the present invention through wholehearted experience and research.

It is an object of the present invention to provide an optical reading head of a scanning apparatus for minimizing the accumulated tolerance.

It is another object of the present invention to provide an optical reading head of a scanning apparatus, in which the base is stably moved on the casing.

It is a further object of the present invention to provide an optical reading head of a scanning apparatus, which has an improved base capable of fixing a lens thereon and is easily detachable when the optical reading head is maintained and reworked and the lens needs to be replaced In accordance with a first aspect of the present invention, there is provided an optical reading head of a scanning apparatus. The optical reading head comprises a casing, an image sensing module, a base, a lens and a sliding frame. The casing has a gliding track on a surface thereof. The image sensing module includes an image sensor. The base is arranged on the surface of the casing, and comprises a rear part and first and second lateral parts, wherein the image sensing module is supported by the rear part. The lens is movable on the gliding track. The sliding frame is disposed between the first and second lateral parts for driving the lens to move along the gliding track in response to an external force.

In accordance with a second aspect of the present invention, there is provided an optical reading head of a scanning apparatus. The optical reading head comprises a casing, an image sensing module, a base and a push rod. The casing contains therein a light source, plural reflective mirrors and a lens. The image sensing module includes an image sensor. The base is arranged on the surface of the casing for supporting the image sensing module, and including a receptacle therein. The push rod is accommodated within the receptacle and coupled to the image sensing module for adjusting the horizontal alignment angle of the image sensing module.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1 is a schematic cross-sectional view illustrating an optical reading head of a conventional scanning apparatus;

FIG. 2 is a schematic cross-sectional view illustrating an optical reading head of a scanning apparatus according to a preferred embodiment of the present invention;

FIGS. 3A~3D are schematic perspective views illustrating a process for assembling the optical reading head of a scanning apparatus according to a first preferred embodiment of the present invention;

FIG. 6A is a schematic exploded view illustrating an optical reading head of a scanning apparatus according to a fourth preferred embodiment of the present invention, in which a fixing member and an adjustable mechanism are included;

DETAILED DESCRIPTION OF THE PREFERRED EMBODIMENT

Figure 3A:
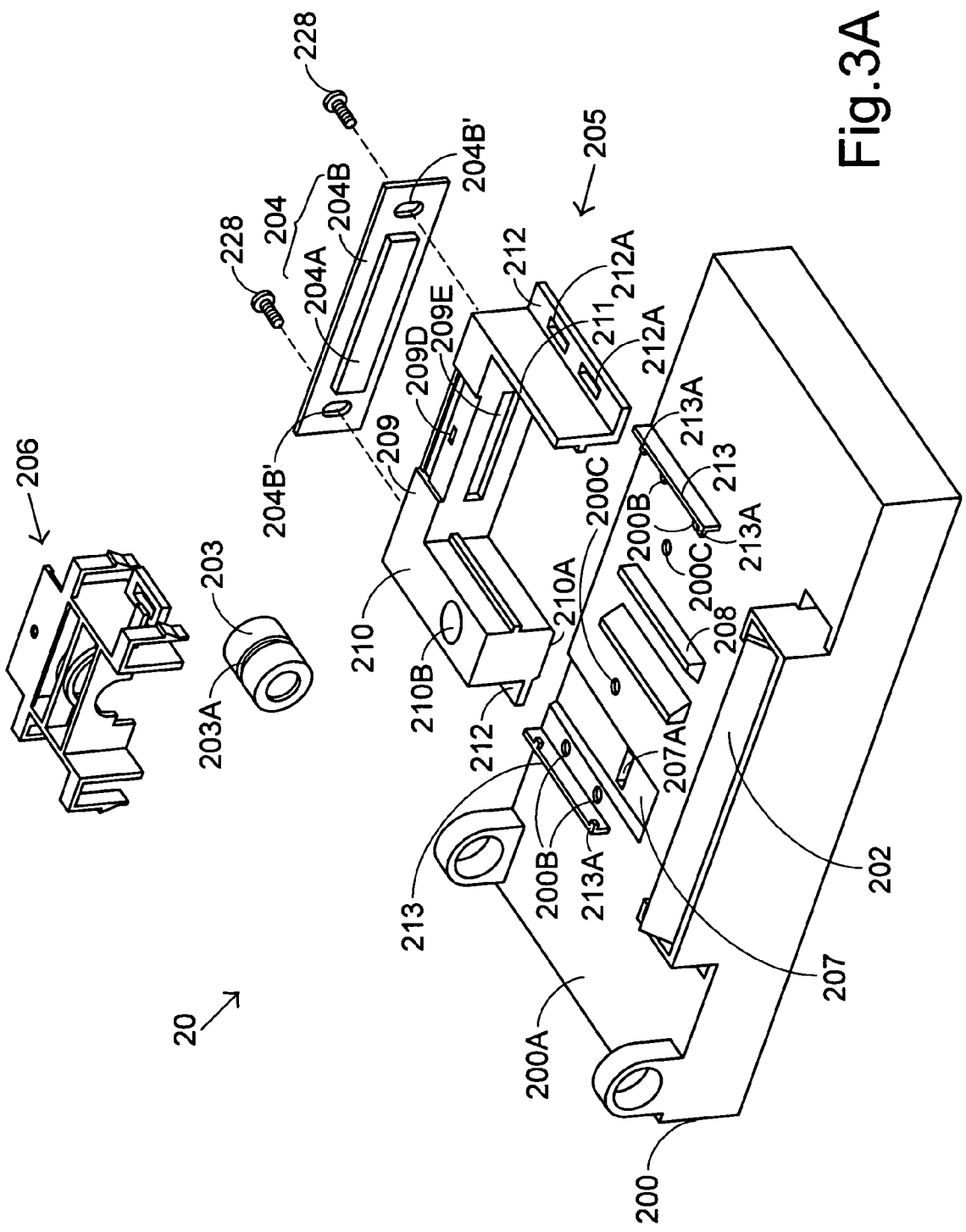

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention. In addition, the elements or structures in the drawings are not limited to the precise form disclosed. Unless specifically stated, the individual element may be extensive to include multiple elements or structures.

Referring to FIG. 2, a schematic cross-sectional view of an optical reading head of a scanning apparatus according to a preferred embodiment of the present invention is shown. The optical reading head 20 of the scanning apparatus 2 comprises a light source 201, plural reflective mirrors 202, a lens 203 and an image sensing module 204 are provided. The light source 201 and the plural reflective mirrors 202 are integrated into a casing 200. Whereas, the image sensing module 204 is arranged on a base 205, and the base 205 is movable on the casing 200. The lens 203 is fixed on the casing 200 via a sliding frame 206, which is mounted on the base 205. In an embodiment of the optical reading head 20, the assembler may separately adjust the position of the lens 203 by moving the sliding frame 206. Meanwhile, optical signals are imaged onto the image sensor, thereby performing the focusing operation. Afterward, by moving the base 205, the lens and the image sensing module 204 are simultaneously moved, thereby performing the magnification correcting operation of the optical reading head 20.

Referring to FIGS. 3A~3D, the process for assembling the optical reading head of a scanning apparatus according to a first preferred embodiment of the present invention is illustrated. For purposes of clarity, only some important components are shown in the drawings.

As shown in FIG. 3A, the optical reading head 20 comprises a casing 200, a base 205, a lens 203, an image sensing module 204 and a sliding frame 206. A gliding track 208 is formed on the top surface 200A of the casing 200, i.e. the surface facing to the base 205. Since the lens 203 is able to stably glide along the gliding track 208, no accumulated tolerance is generated. The image sensing module 204 comprises an image sensor 204A and a circuit board 204B. Two guiding slots or guiding holes 204B' are formed on opposite edges of the circuit board 204B. The base 205 includes a rear part 209 and two lateral parts 210 and 211. A middle space is defined between the rear part 209 and the lateral parts 210 and 211 for accommodating the sliding frame 206 therein.

In addition, in order that the base 205 is in close contact with the casing 200 and stably moved on the casing 200, two mating elements such as a gliding channel 207 and a protrusion part 210A are formed on the top surface 200A of the casing 200 and the lateral part 210 of the base 205, respectively. The gliding channel 207 and the protrusion part 210A have complementary shapes. Due to the complementary shapes, the bottom of the base 205 is in close contact with the casing 200 and stably moved along the gliding channel 207 after the base 205 is mounted on the casing 200. It is noted that, however, those skilled in the art will readily observe that numerous modifications and alterations of the mating elements may be made while retaining the teachings of the invention. For example, the protrusion part and the gliding channel may be formed on the casing 200 and the base 205, respectively, as long as they have complementary shapes. Accordingly, the above disclosure should be limited only by the bounds of the following claims.

Figure 4A:
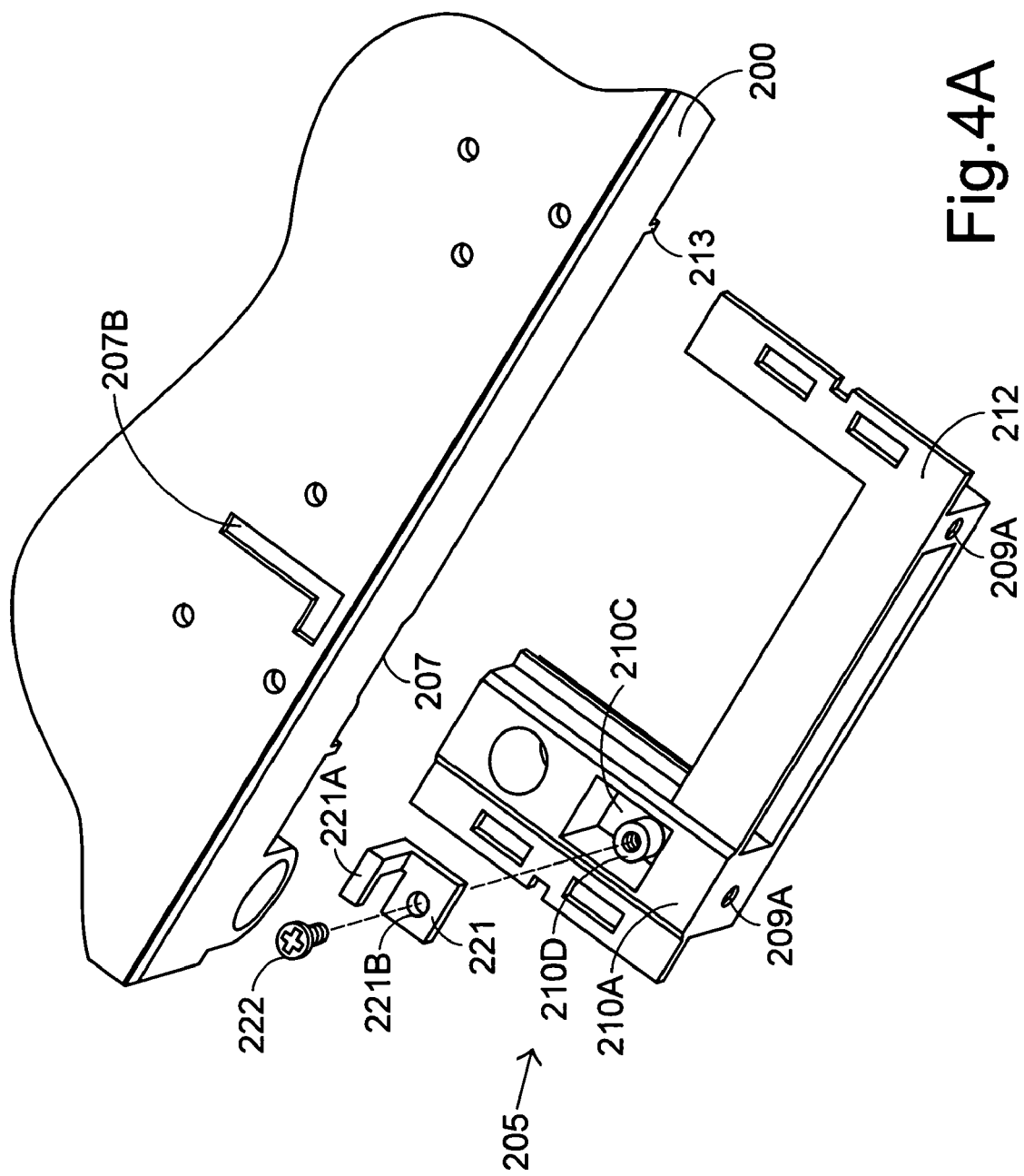
FIGS. 4A~4C are schematic perspective views illustrating the fixing member of an optical reading head according to a second preferred embodiment of the present invention.

Please refer to FIGS. 3A and 3B. The image sensing module 204 is combined with the base 205 by penetrating the screws 228 through corresponding guiding slots 204B' and screwing the screws 228 into corresponding screw holes 209A (as shown in FIG. 4A) at the rear part 209 of the base 205. Afterward, the combination of the base 205 and the image sensing module 204 will be placed on the top surface 200A of the casing 200 and stably moved along the gliding channel 207 upon engagement with the protrusion part 210A.

Please refer to FIGS. 3A and 3B again. For assuring that the base 205 is stably moved on the casing 200, two horizontal bottom planes 212 are protruded from the external surfaces of the lateral parts 210 and 211 of the base 205, respectively. In addition, two guiding rails 213 which are parallel to the gliding channel 207 are formed on the top surface 200A of the casing 200, thereby limiting the moving directions of the horizontal bottom planes 212. In order to fix the base 205 on the casing 200, guiding slots 212A and corresponding screw holes 200B are formed in the horizontal bottom planes 212 and the top surface 200A of the casing 200, respectively. The base 205 will be fixed on the casing 200 by penetrating the screws 215 through corresponding guiding slots 212A and screwing the screws 215 into corresponding screw holes 200B. Moreover, protrusion structures 213A are formed on the top edges of the guiding rails 213 in order to prevent detachment of the base 205 from the casing 200 upon movement of the base 205.

Figure 3D:
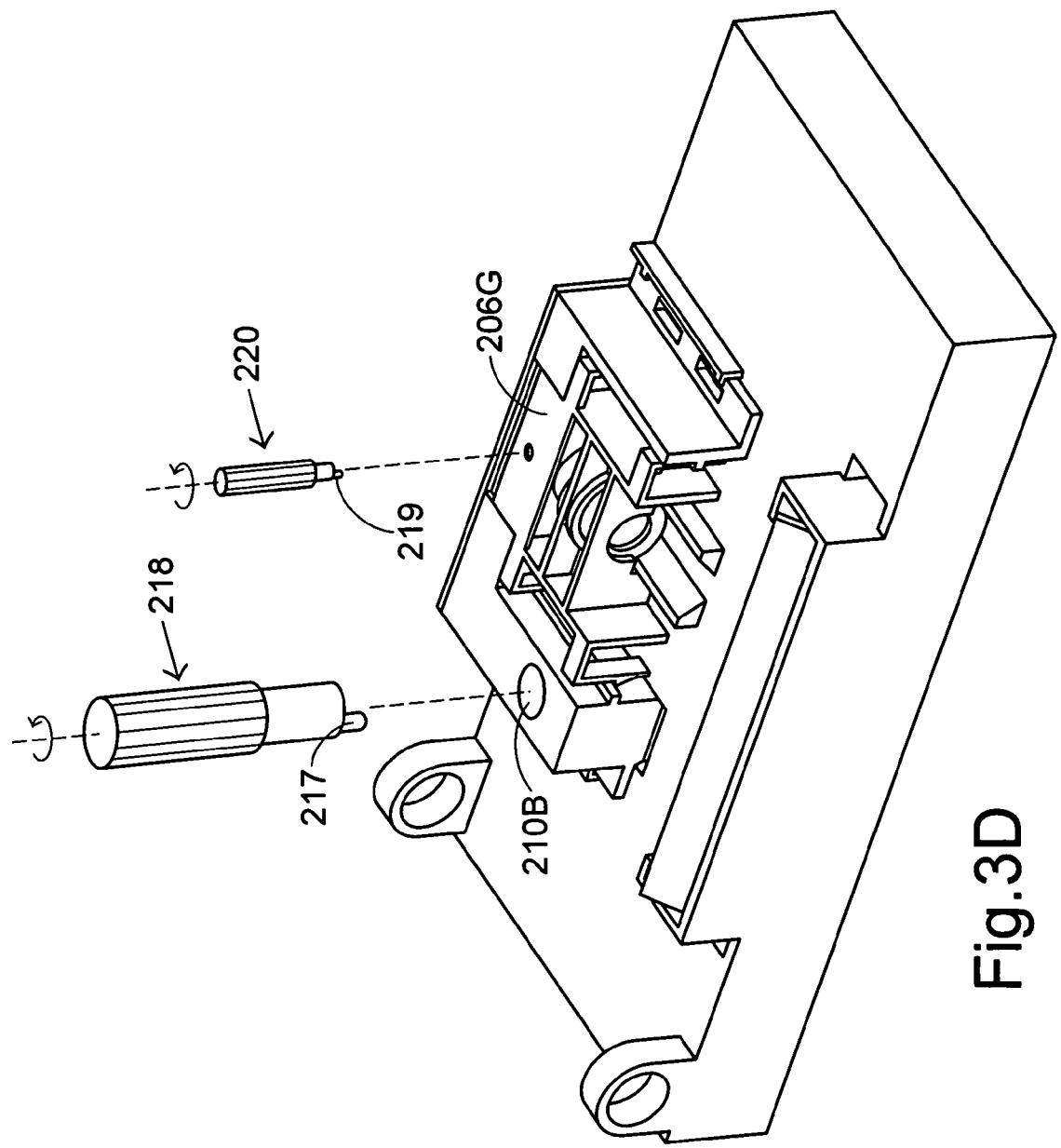

Please refer to FIGS. 3A~3D. The base 205 can support the image sensing module 204 and be stably moved on the casing 200. Furthermore, after the base 205 is combined with the casing 200, the gliding track 208 is disposed in the space defined between the rear part 209 and the lateral parts 210 and 211 of the base 205. As shown in FIG. 3B, the lens 203 is subsequently placed on the gliding track 208. Afterward, as shown in FIG. 3D, the sliding frame 206 is accommodated within the space between the rear part 209 and the lateral parts 210 and 211 of the base 205 so as to fix the lens 203. Under this circumstance, the lens 206 is movable along the gliding track 208. By the way, the rear part 209 of the base 205 further comprises a sensing window 209E. Via the sensing window 209E, the optical signals from the lens 203 will be imaged onto the image sensing module 204.

Please refer to FIGS. 3A~3D again. For a purpose of coupling the sliding frame 206 with the base 205, two horizontal blocks 214 are formed on the internal walls of the lateral parts 210 and 211 of the base 205, and both sides of the sliding frame 206 comprise several horizontal wings 206A and L-shaped tenons 206B corresponding to the horizontal blocks 214. After the horizontal wings 206A and the L-shaped tenons 206B clamp the top sides and the bottom sides of the horizontal blocks 214, the sliding frame 206 is coupled with the base 205 and movable along the horizontal blocks 214 forwardly or backwardly. On the other hand, the sliding frame 206 and the lens 203 have engaging elements matching with each other. For example, the periphery of the lens 203 has a ring-shaped recess structure 203A matching with a protrusion structure 206C on the sliding frame 206 (as shown in FIG. 3C). When the sliding frame 206 is coupled with the base 205, the protrusion structure 206C is engaged with the ring-shaped recess structure 203A. Once the sliding frame 206 is moved, the protrusion structure 206C will push against the ring-shaped recess structure 203A. Meanwhile, the lens 203 is moved along the gliding track 208, thereby adjusting the distance between the lens 203 and the image sensor 204A. It is noted that, however, those skilled in the art will readily observe that numerous modifications of the engaging elements may be made while retaining the teachings of the invention. For example, two ring-shaped recess structures 203A and two protrusion structures 206C are formed on the lens 203 and the sliding frame 206, respectively. Accordingly, the above disclosure should be limited only by the bounds of the following claims. Furthermore, the sliding frame 206 comprises a light shading plate 206D for filtering off the undesirable stray light and an arc-shaped holder 206E for assisting the protrusion structure 206C to fix the lens 203.

Please refer to FIGS. 3B~3D. The sliding frame 206 comprises two horizontal wings 206F on the bottom and bilateral sides thereof. Each horizontal wing 206F has a guiding slot 206F' corresponding to the screw hole 200C on the top surface 200A of the casing 200. By penetrating the screws 216 through corresponding guiding slots 206F' and screwing the screws 216 into corresponding screw holes 200C, the sliding frame 206 is fixed on the casing 200, as is shown in FIG. 3D.

Moreover, in order that the lens 203 is driven by the sliding frame 206 mounted on the base 205 to be stably moved along the gliding track 208, the rear part 209 of the base 205 comprises a guiding structure corresponding to a horizontal tail plane 206G arranged at the top side of the sliding frame 206. As shown in FIG. 3B, an example of the guiding structure includes a gliding indentation 209B. Once the sliding frame 206 is coupled with the base 205 and moved thereon, the horizontal tail plane 206G overlying the gliding indentation 209B will be guided to stably move forwardly or backwardly by the gliding indentation 209B. It is noted that, however, those skilled in the art will readily observe that numerous modifications of the guiding structure may be made while retaining the teachings of the invention. For example, the guiding structure may comprise two raised gliding tracks for guiding the horizontal tail plane 206G. Accordingly, the above disclosure should be limited only by the bounds of the following claims.

Please refer to FIGS. 3B~3D. In order that the lens 203 is driven by the sliding frame 206 mounted on the base 205 to be moved along the gliding track 208 to a certain extent, the rear part 209 of the base 205 comprises a transverse recess structure 209C corresponding to a protrusion part 206H extending downwardly from a terminal of the horizontal tail plane 206G of the sliding frame 206. Under this circumstance, once the sliding frame 206 is coupled with the base 205, as shown in FIG. 3D, the protrusion part 206H is accommodated within the recess structure 209C, and the movable range is restricted by the recess structure 209C.

Please refer to FIGS. 3A and 3B. In order that the assembler is able to use the sliding frame 206 and the base 205 to precisely adjust the positions, the horizontal tail plane 206G of the sliding frame 206 comprises a perforation 206I corresponding to the linear recess structure 209D on the top surface of the rear part 209 of the base 205, thereby facilitating the focusing operation. In addition, the lateral part 210 of the base 205 comprises a downward perforation 210B corresponding to a linear recess structure 207A in the gliding channel 207 of the casing 200, thereby facilitating the magnification correcting operation.

Figure 3E:
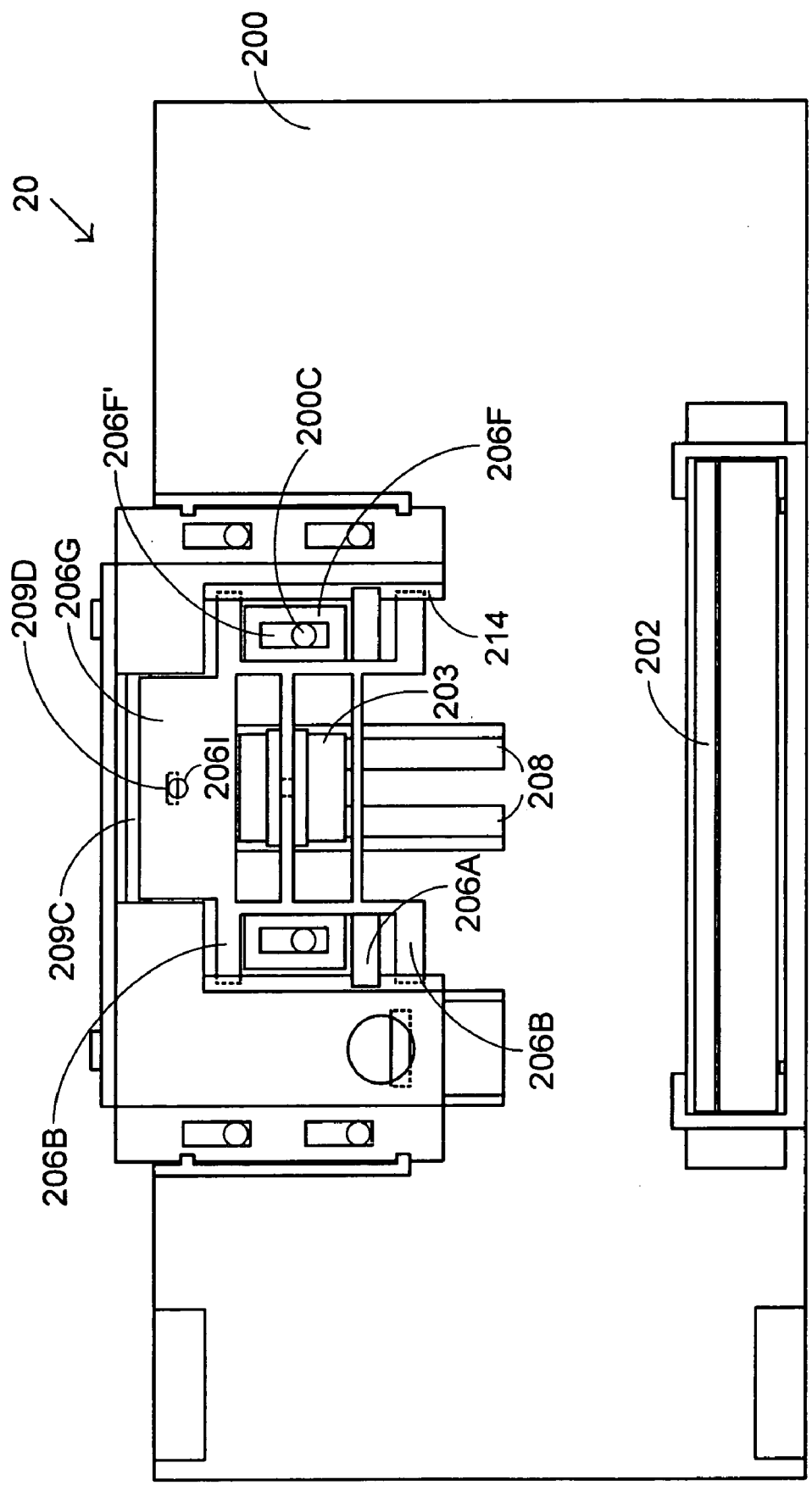
FIGS. 3E~3G are schematic top views illustrating the approaches for performing focusing and magnification correcting operations according to the first preferred embodiment of the present invention.
Figure 3F:
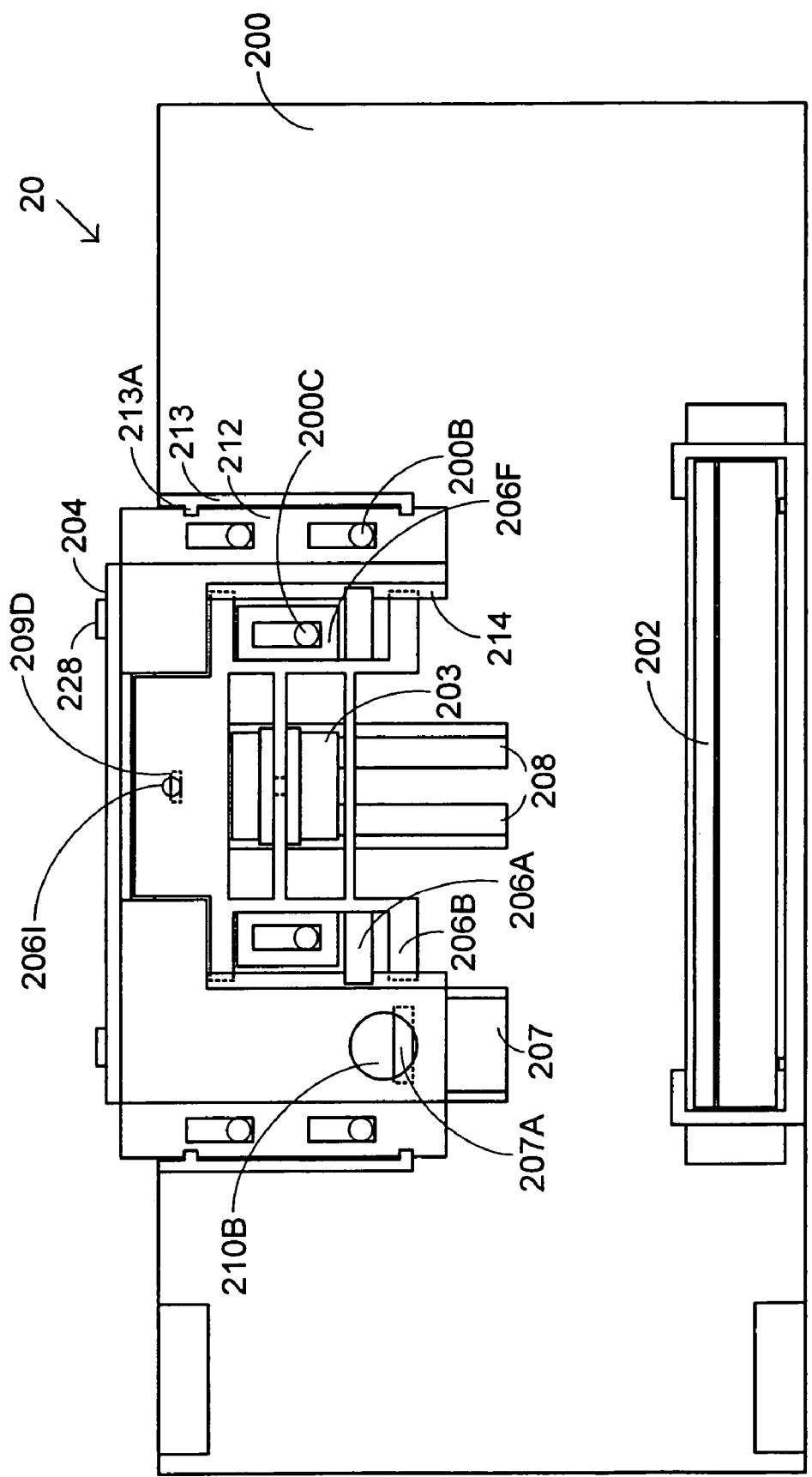

Please also refer to FIGS. 3D to 3F. After the sliding frame 206 is coupled to the base 205, a portion of the linear recess structure 209D is exposed from the perforation 206I. By inserting the eccentric cam 219 of an adjustment shaft 220 into the linear recess structure 209D through the perforation 206I, the assembler may adjust movement of the sliding frame 206. The eccentric cam 219 will move the linear recess structure 209D upon rotation of the adjustment shaft 220 such that the sliding frame 206 is moved on the horizontal blocks 214 of the base 205. As shown in FIGS. 3E and 3F, the lens 203 is moved on the gliding track 208 in response to movement of the sliding frame 206, thereby performing the focusing operation.

Figure 3G:
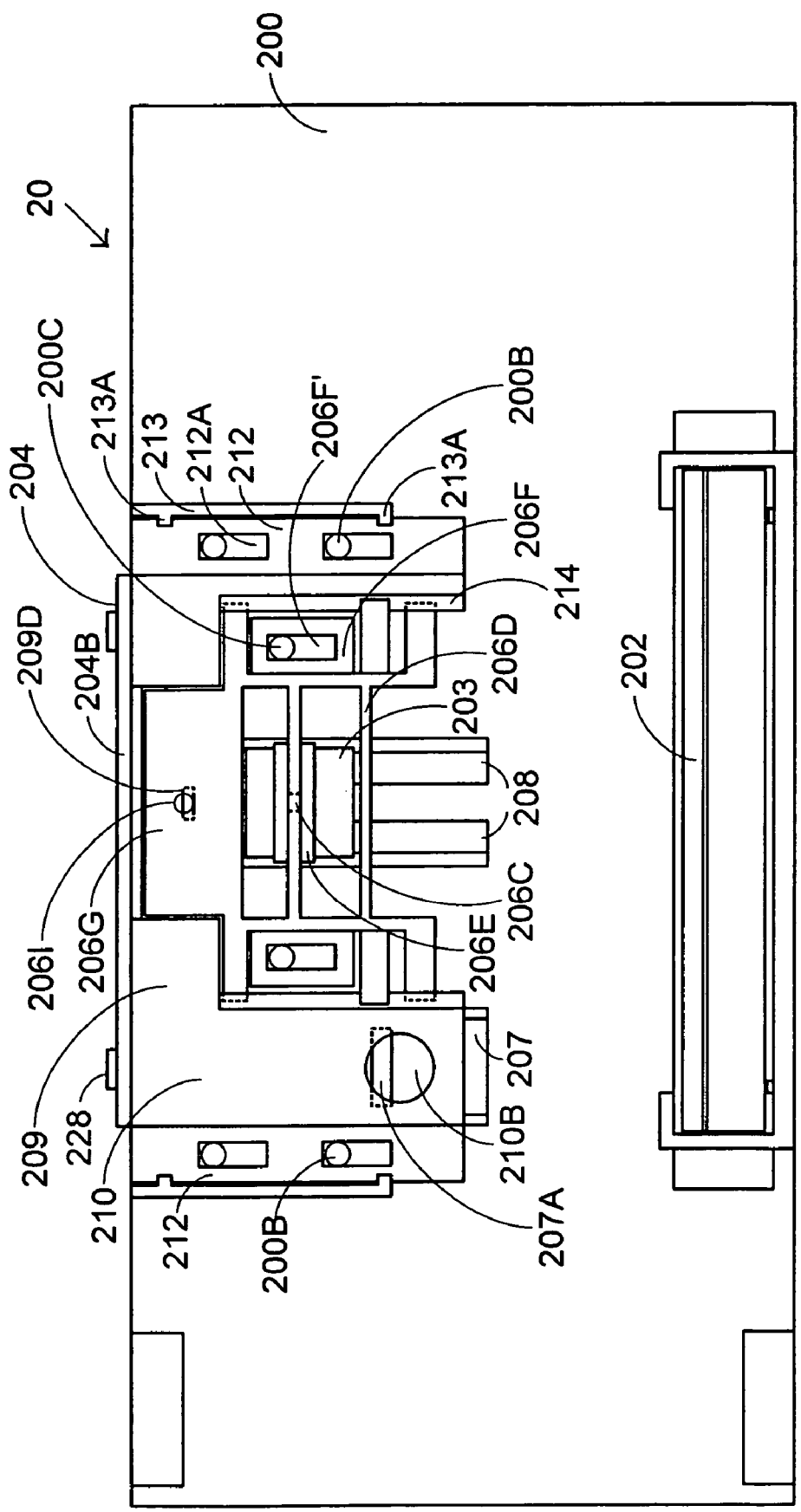

Please refer to FIGS. 3D, 3F and 3G. After the base 205 is mounted on the casing 200, a portion of the linear recess structure 207A is exposed from the perforation 210B. By inserting the eccentric cam 217 of an adjustment shaft 218 into the linear recess structure 207A through the perforation 210B, the assembler may adjust movement of the base 205. The eccentric cam 217 will move the linear recess structure 207A upon rotation of the adjustment shaft 218 such that the base 205 is moved along the gliding channel 207. As shown in FIGS. 3F and 3G, the lens 203, the image sensing module 204 and the sliding frame 206 are synchronously moved in response to movement of the base 205, thereby performing the magnification correcting operation.

Figure 3H:
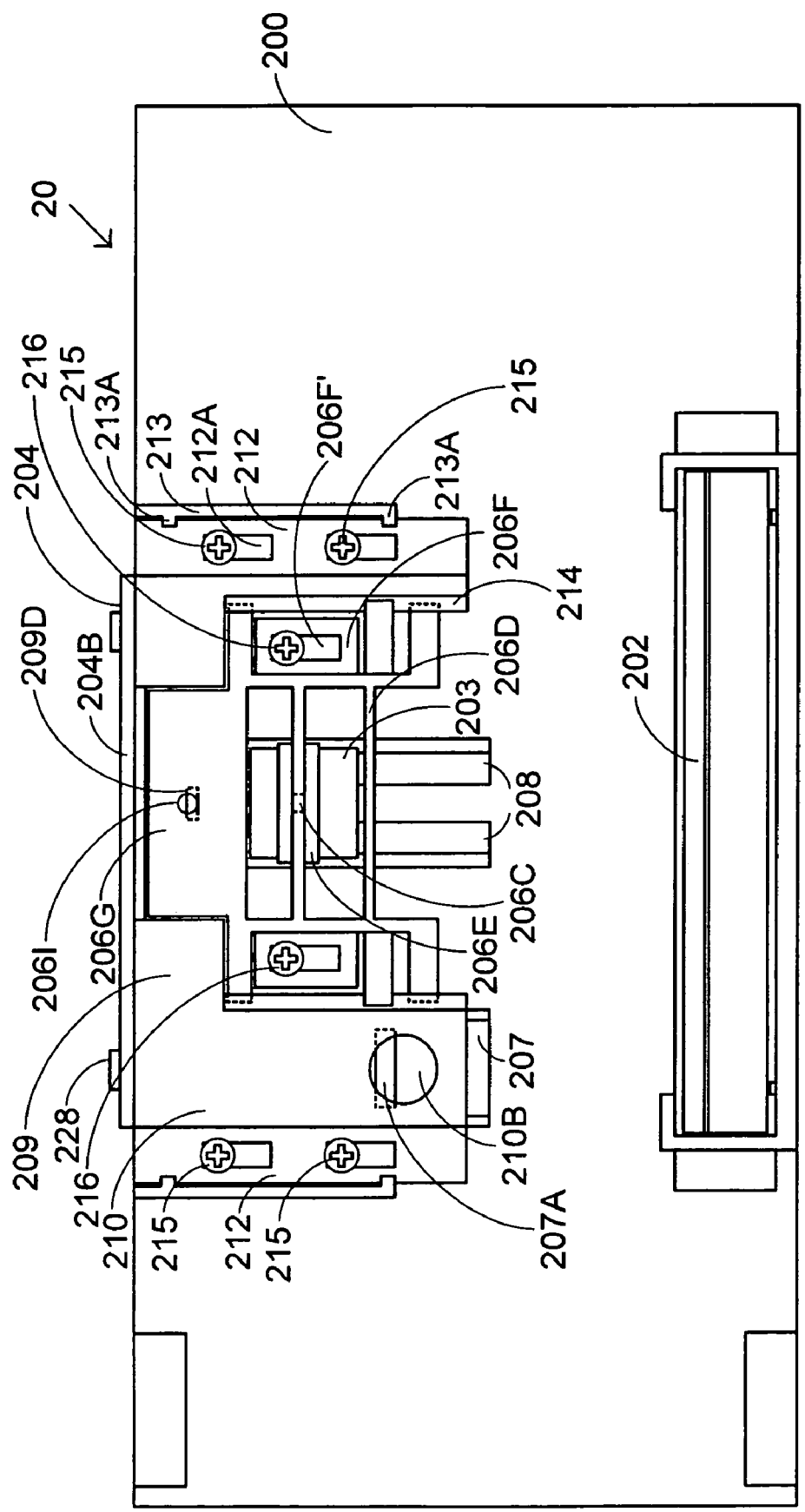
FIG. 3H is a schematic top view illustrating that the base and the sliding frame are fixed onto the casing after the focusing and magnification correcting operations are completed according to the first preferred embodiment of the present invention.

Please refer to FIG. 3H. After the magnification tolerance of the optical reading head 20 is adjusted to be equal to or less than an acceptable preset value by fine-tuning adjustment of using the adjustment shafts, the screws 215 and 216 penetrate through the guiding slots 212A of the base 205 and the guiding slots 206F' of the sliding frame 206 and are screwed into the screw holes 200B and 200C of the top surface 200A of the casing 200, respectively. Under this circumstance, the base 205 and the sliding frame 206 are fixed onto the casing 200. On the other hand, if the optical reading head 20 is maintained and reworked and the lens needs to be replaced, the screws 215 and 216 should be firstly loosened and then the sliding frame 206 and the base 205 are detached. After the related components are replaced and the focusing and magnification correcting operations are completed, the base 205 and the sliding frame 206 are fixed onto the casing 200 again. Alternatively, the top surface 200A of the casing 200 has several perforations therein, and a metal plate (not shown) with corresponding number of screw holes are placed under the rear surface of the casing 200. After the screws 215 and 216 are penetrated through the perforations and the screws 215 and 216 are screwed into the screw holes, the base 205 and the sliding frame 206 are fixed onto the casing 200.

Figure 4B:
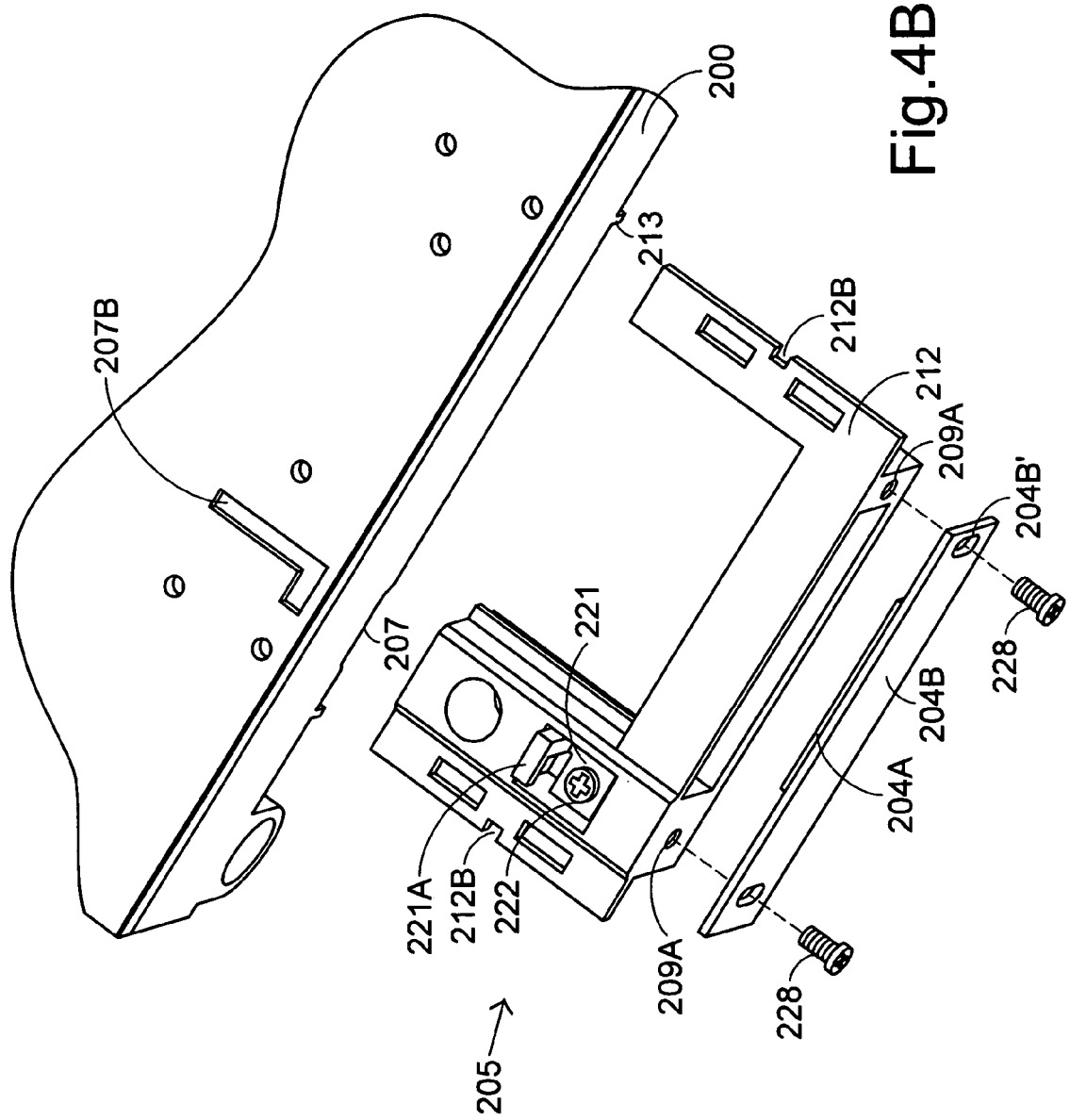
Figure 4C:
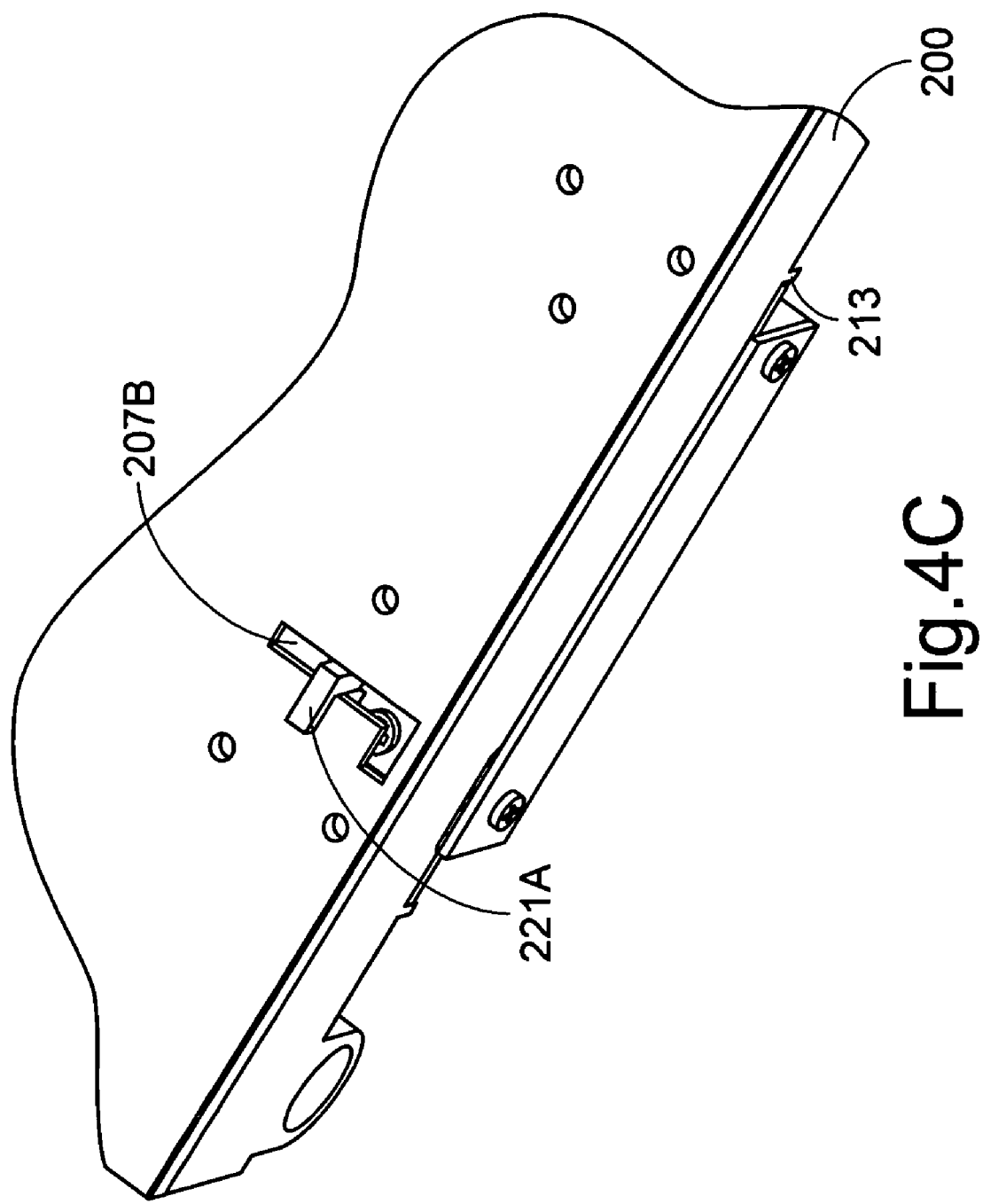

In order that the protrusion part 210 at the lateral part 210 of the base 205 is in more close contact with the gliding channel 207 when the base 205 is moved on the casing 200, the optical reading head 20 may further comprise a fixing member on the base 205 and a corresponding structure on the casing 200, thereby preventing shift after the magnification correcting operation. Referring to FIG. 4A, an optical reading head according to a second embodiment of the present invention is illustrated. In this embodiment, the basic components included therein are similar to those described in the first embodiment, and are not to be redundantly described herein. The base 205 of this embodiment further comprises a receptacle 210C on the bottom surface of the rear part 210. A screw hole pedestal (or screw hole) 210D is disposed in the receptacle 210C. The fixing member of the base 205 includes a fixing plate 221 having an L-shaped hooking structure 221A and a perforation 221B. After a screw 222 penetrates through the perforation 221B and is screwed into the screw hole pedestal 210D, the fixing plate 221 is fixed in the receptacle 210C but the L-shaped hooking structure 221A is protruded from the receptacle 210C, as shown in FIG. 4B. On the other hand, the casing 200 of the optical reading head 20 further comprises an L-shaped guiding slot 207B in the gliding channel 207. For a purpose of coupling the base 205 with the housing 200, the L-shaped hooking structure 221A should firstly penetrate through the shorter side of the L-shaped guiding slot 207B. After the base 205 is moved on the casing 200, the L-shaped hooking structure 221A is hooked on periphery of the longer side of the L-shaped guiding slot 207B, as can be seen in FIG. 4C. Meanwhile, the protrusion part 210A of the base 205 is also in close contact with the gliding channel 207. Likewise, as is shown in FIG. 3D, by using the adjustment shaft 218, the protrusion part 210A is moved along the gliding channel 207.

Please refer to FIGS. 3A and 4B again. In the first embodiment of FIG. 3A, the base 205 is directly coupled with the gliding channel 207 of the casing 200. Whereas, in the second embodiment of FIG. 4B, the base 205 is coupled with the housing 200 by penetrating the L-shaped hooking structure 221A through the shorter side of the L-shaped guiding slot 207B and hooking the L-shaped hooking structure 221A on periphery of the longer side of the L-shaped guiding slot 207B. Furthermore, each of the horizontal bottom planes 212 further comprises a notch structure 212B corresponding to the L-shaped hooking structure 221A. After the L-shaped hooking structure 221A penetrates through the shorter side of the L-shaped guiding slot 207B, the protrusion structures 213A on the top edges of the guiding rails 213 will pass through the notch structures 212B and thus the protrusion part 210A of the base 205 is embedded within the gliding channel 207. Under this circumstance, the base 205 is movable on the gliding channel 207 and then fixed on the casing 200 by hooking the L-shaped hooking structure 221A on periphery of the longer side of the L-shaped guiding slot 207B.

Figure 5A:
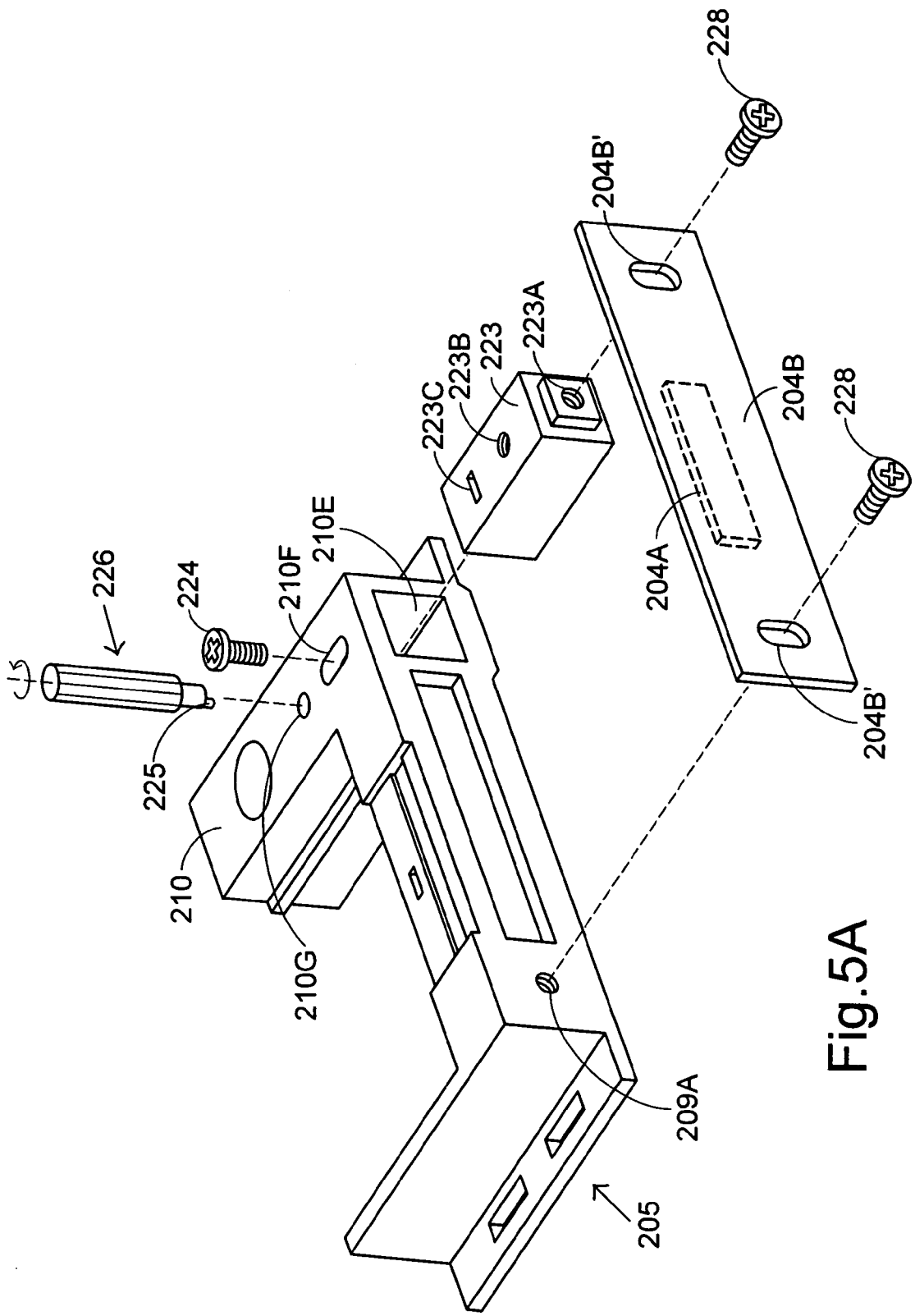
FIG. 5A is a schematic exploded view illustrating an optical reading head of a scanning apparatus according to a third preferred embodiment of the present invention, in which an adjustable mechanism is included.

On the other hand, due to the inherent imaging tolerance of the lens 203 during the process of assembling the optical reading head 20, the optical path from the optical signals to the image sensor 204A is readily sloped. For a purpose of minimizing the sloped optical path, a third embodiment of an optical reading head 20 is illustrated on FIGS. 5A~5C. In addition to the components described in the first embodiment, the optical reading head 20 of this embodiment further comprises an adjustable mechanism included in the image sensing module 204. By means of the adjustable mechanism, the horizontal alignment angle of the image sensing module 204 is adjustable. In the optical reading head 20 of FIG. 5A, a push rod or a push block 223 is arranged in the connection portion of the base 205 and the circuit board 204B of the image sensing module 204. Furthermore, a receptacle 210E is formed in the lateral part 210 of the base 205 for accommodating the push rod 223. By using the push rod 223, the assembler is able to push the circuit board 204B outwards by a certain distance. Under this circumstance, the sloped angle of horizontal alignment would be corrected, thereby overcoming the problem of sloped optical path.

Please refer to FIG. 5A again. Before the position of the push rod 223 is adjusted, the push rod 223 is coupled with the circuit board 204B and the base 205. By a screw 228 penetrates through a screw hole 223A at the front end of the push rod 223 and then the screw 228 is screwed into corresponding guiding slot 204B' of the circuit board 204B, the circuit board 204B is fixed on the front end of the push rod 223. Whereas, the top surface of the push rod 223 further comprises a screw hole 233B and a linear recess structure 223C corresponding to a downward guiding slot 210F and a perforation 210G on the lateral part 210 of the base 205. After the push rod 223 is accommodated within the receptacle 210E, the rear end of the push rod 223 is coupled to the base 205 by penetrating a screw 224 through the guiding slot 210F and the screw hole 233B and loosely screwing the screw 224 into the screw hole 233B.

Please refer to FIGS. 5A to 5C again. After the push rod 223 is coupled to the base 205, a portion of the linear recess structure 223C is exposed from the perforation 210G. By inserting the eccentric cam 225 of an adjustment shaft 226 into the linear recess structure 223C through the perforation 210G, the assembler may adjust movement of the push rod 223. The eccentric cam 225 will move the linear recess structure 223C toward the circuit board 204B upon rotation of the adjustment shaft 226. Under this circumstance, since the alignment angle of the image sensing module 204 is precisely adjusted, the problem of sloped optical path is minimized.

Figure 5B:
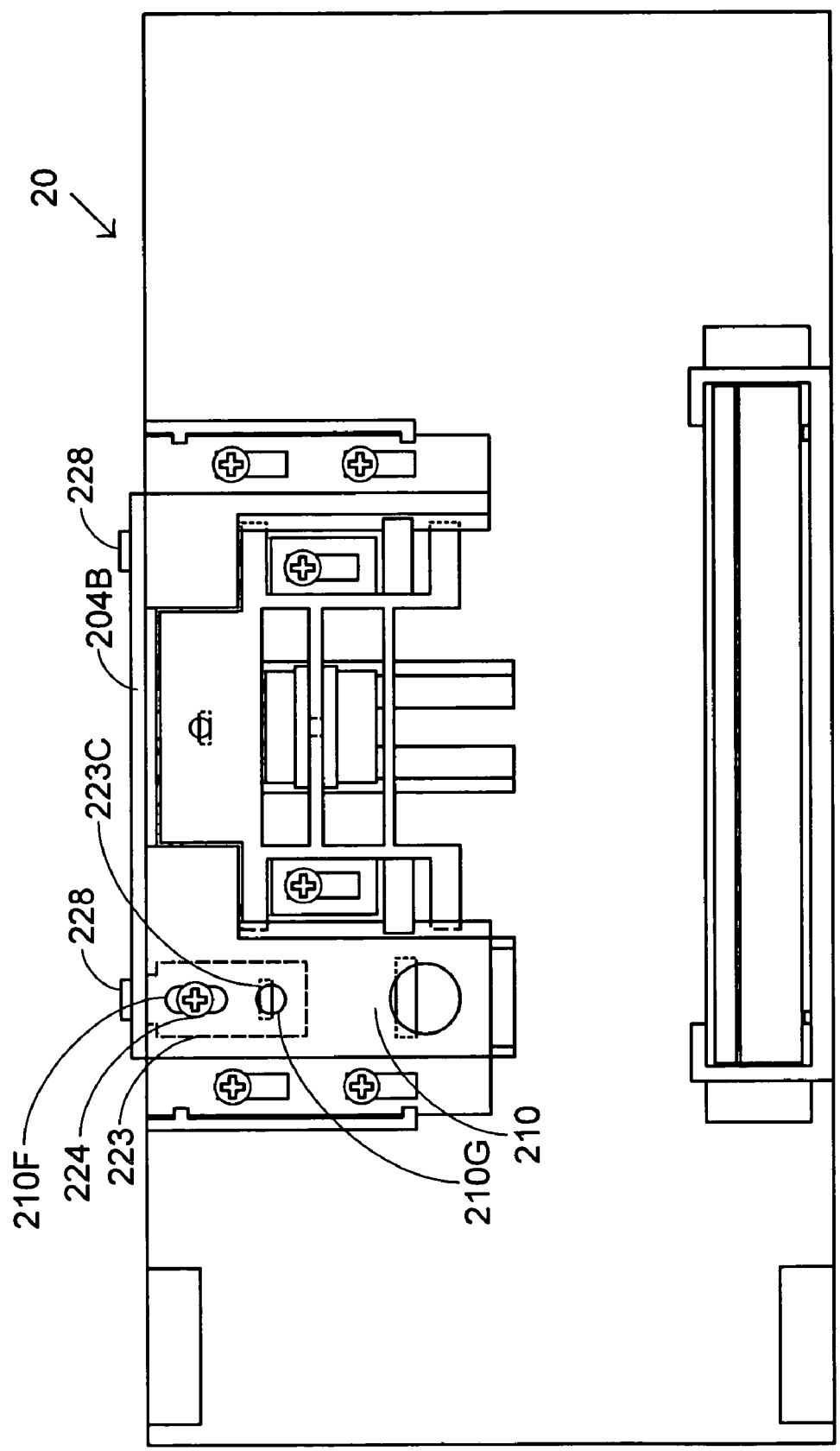
FIGS. 5B~5C are schematic top views illustrating the approaches for adjusting the alignment angle of the image sensing module by the adjustable mechanism according to the third preferred embodiment of the present invention.
Figure 5C:
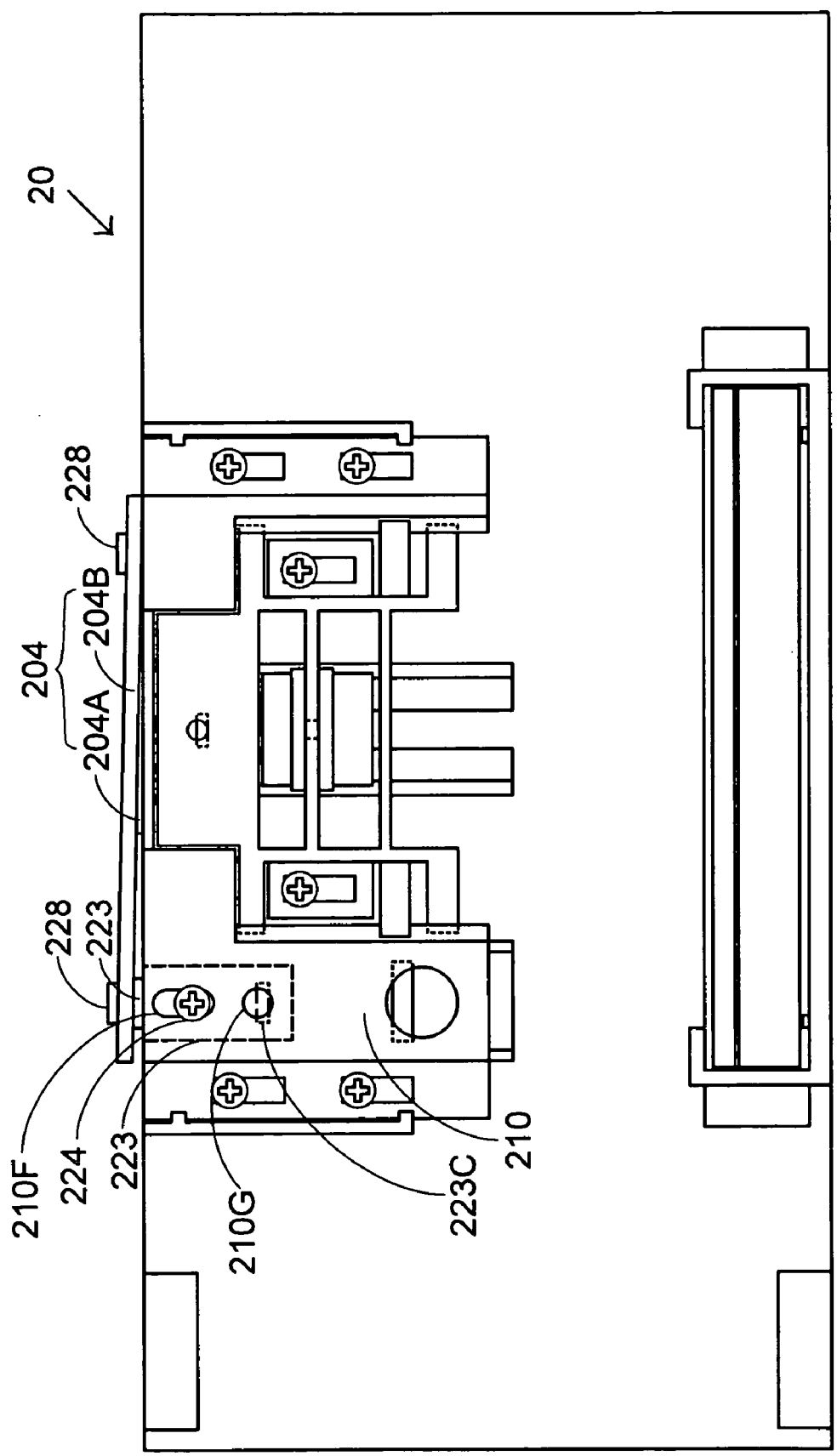

Once the adjusted optical path is acceptable, by firmly screwing the screw 224 into the screw hole 233B, the push rod 223 is completely secured to the base 205. As shown in FIGS. 5B and 5C, one edge of the circuit board 204B is pushed away from the base 205 by the push rod 223, the horizontal alignment angle of the image sensing module 204 is precisely adjusted, and thus the sloped optical path of the optical reading head 30 is corrected.

In the third preferred embodiment as described above, the push rod 223 is coupled with the base 205 via the engagements of the screw hole 233B and the linear recess structure 223C on the top surface of the push rod 223 corresponding to the guiding slot 210F and the perforation 210G on the lateral part 210 of the base 205, respectively. Alternatively, the screw hole 233B and the linear recess structure 223C may be disposed at a lateral side of the push rod 223 as long as the locations of the guiding slot 210F and the perforation 210G conform to those of the screw hole 233B and the linear recess structure 223C. It is noted that, however, those skilled in the art will readily observe that numerous modifications of the adjustable mechanism may be made while retaining the teachings of the invention. For example, the box-shaped push rod 223 may be replaced by other adjustable mechanism with any shape as long as a screw hole and a linear recess structure are provided on the top or lateral side thereof. Accordingly, the above disclosure should be limited only by the bounds of the following claims.

Figure 6B:
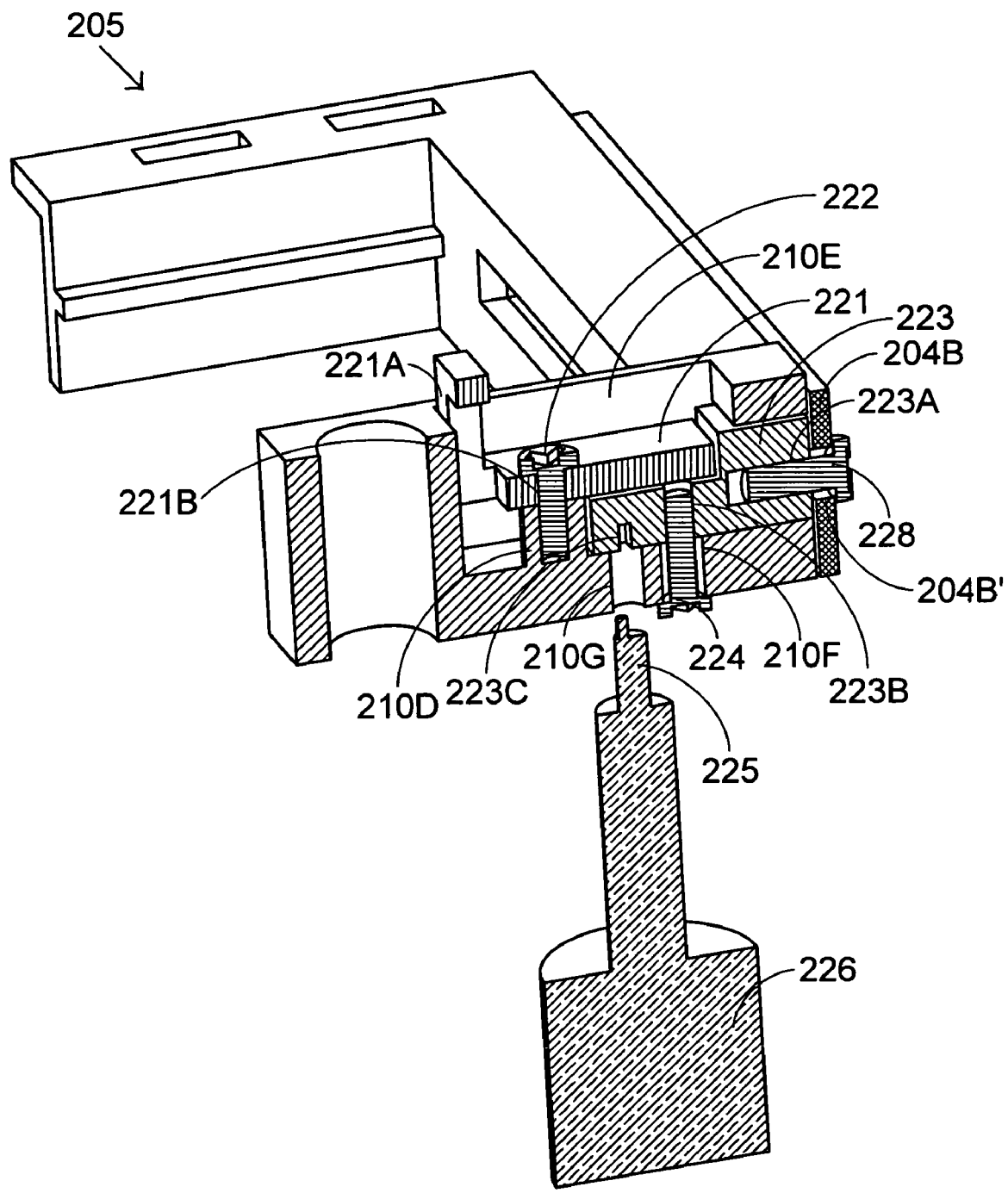
FIG. 6B is a partial cross-sectional view illustrating the fixing member and the adjustable mechanism of the optical reading head according to the fourth preferred embodiment of the present invention.

A fourth embodiment of an optical reading head 20 is illustrated in FIGS. 6A and 6B. In this embodiment, the basic components included therein are similar to those described in the first embodiment, and are not to be redundantly described herein. Moreover, the features of the fixing member described in the second embodiment and the adjustable mechanism described in the third embodiments of the present invention are integrated into the optical reading head 20 of this embodiment. In FIG. 6A, the base 205 comprises a receptacle 210E on the bottom surface of the rear part 210 and a fixing plate 221. The fixing plate 221 has an L-shaped hooking structure 221A and a perforation 221B and is accommodated and fixed in the receptacle 210E, as is similar to that shown in FIG. 4A. The base 205 further comprises an entrance 210H in communication with the receptacle 210E. Through the entrance 210H, the push rod or a push block 223 would be pushed forwardly and accommodated within the receptacle 210E. In this embodiment, after the L-shaped hooking structure 221A of the fixing plate 221 is hooked on periphery of the L-shaped guiding slot 207B, the base 205 is fixed on the casing 200. In addition, the fixing plate 221 may limit the moving range of the push rod 223 because the fixing plate 221 suppresses the push rod 223. As shown in FIG. 6B, by screwing the screw 222 into the screw hole pedestal 210D in the receptacle 210E, the fixing plate 221 is coupled to the base 205 and a portion of the push rod 223 is suppressed by the fixing plate 221, thereby fixing the push rod 223 in the receptacle 210E. By loosely screwing the screw 224 into the screw hole 233B through the guiding slot 210F, the push rod 223 is preliminarily coupled to the base 205. Then, by screwing a screw 228 into the guiding slot 204B' of the circuit board 204B, the circuit board 204B is fixed on the front end of the push rod 223. Meanwhile, by inserting the eccentric cam 225 of an adjustment shaft 226 into the linear recess structure 223C through the perforation 210G, the assembler may adjust movement of the push rod 223. The eccentric cam 225 will move the linear recess structure 223C toward the circuit board 204B upon rotation of the adjustment shaft 226. Under this circumstance, since the alignment angle of the image sensing module 204 is precisely adjusted, the problem of sloped optical path is minimized.

Figure 7A:
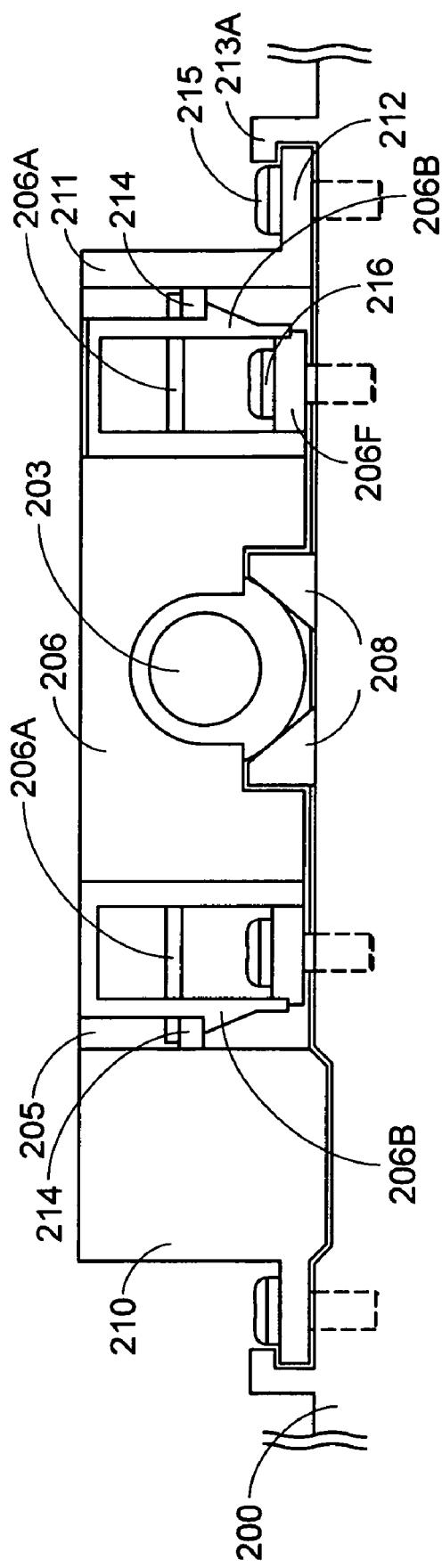
FIG. 7A is a schematic front view illustrating a combination of the sliding frame and the base according to either of the first to fourth preferred embodiments of the present invention.

Referring to FIG. 7A, a combination of the sliding frame 206 and the base 205 according to either of the first to fourth preferred embodiments of the present invention is illustrated. Two horizontal blocks 214 are formed on the internal walls of the lateral parts 210 and 211 of the base 205, and both sides of the sliding frame 206 comprise several horizontal wings 206A and L-shaped tenons 206B corresponding to the horizontal blocks 214. After the horizontal wings 206A and the L-shaped tenons 206B clamp the top sides and the bottom sides of the horizontal blocks 214, the sliding frame 206 is coupled with the base 205 and movable along the horizontal blocks 214 forwardly or backwardly.

Figure 7B:
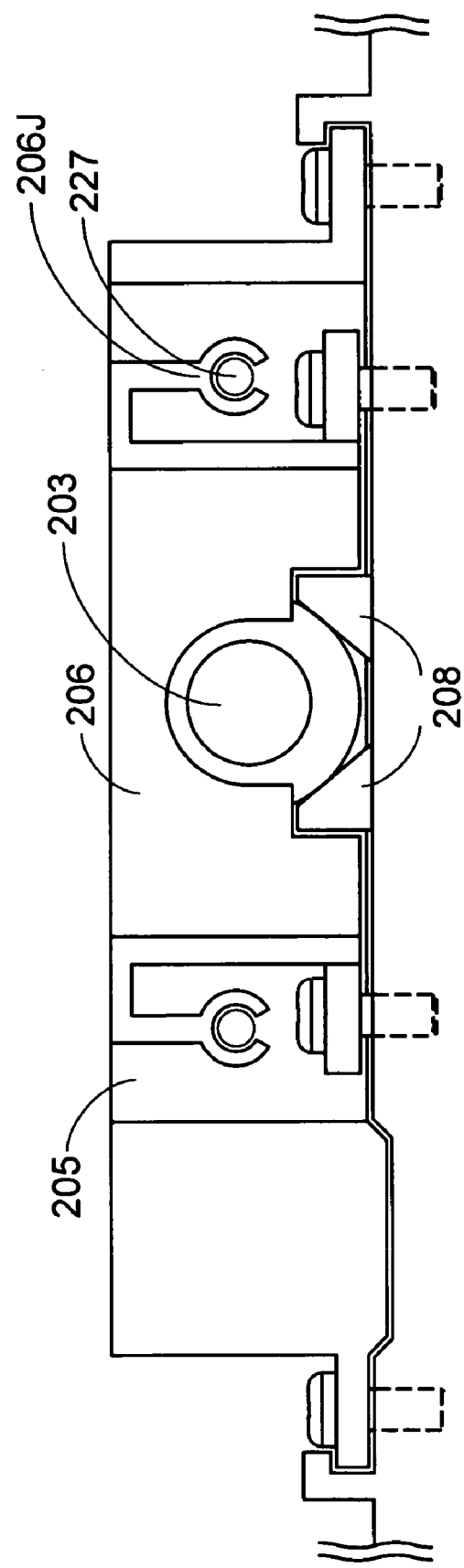
FIG. 7B is a schematic front view illustrating a combination of the sliding frame and the base according to a fifth preferred embodiment of the present invention.

Referring to FIG. 7B, a combination of the sliding frame 206 and the base 205 according to a fifth preferred embodiment of the present invention is illustrated. Two sliding rods 227 are provided on opposite sides of the base 205. Each side of the sliding frame 206 has an arc-shaped tenon 206J engaged with a corresponding sliding rod 227. The sliding frame 206 is movable along the sliding rods 227 of the base 205 forwardly or backwardly such that the lens 203 is driven to move on the gliding track 208. It is noted that, however, those skilled in the art will readily observe that numerous modifications of the sliding rod 227 and the tenon 206J may be made while retaining the teachings of the invention. Accordingly, the above disclosure should be limited only by the bounds of the following claims.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical reading head of a scanning apparatus, comprising:
    a casing having a gliding track on a surface thereof;
    an image sensing module including an image sensor;
    a base arranged on said surface of said casing, and comprising a rear part and first and second lateral parts, wherein said image sensing module is supported by said rear part;
    a lens movable on said gliding track; and
    a sliding frame disposed between said first and second lateral parts for driving said lens to move along said gliding track in response to an external force.

2. The optical reading head according to claim 1 further comprising a pair of mating elements having complementary shapes and formed on said surface of said casing and the bottom of said first lateral part of said base, respectively.

3. The optical reading head according to claim 2 wherein said mating elements include a gliding channel and a protrusion part.

4. The optical reading head according to claim 3 further comprises two guiding rails parallel to said gliding channel and formed on said surface of said casing, thereby limiting the moving directions of said horizontal bottom planes.

5. The optical reading head according to claim 4 wherein two protrusion structures are formed on the top edges of said guiding rails, thereby preventing detachment of said base from said casing upon movement of said base.

6. The optical reading head according to claim 3 wherein a linear recess structure is formed in said gliding channel, and said first lateral part has a downward perforation corresponding to said linear recess structure, wherein a portion of said linear recess structure is exposed from said downward perforation when said base is mounted on said casing.

7. The optical reading head according to claim 1 further comprising two horizontal bottom planes protruded from the external surfaces of said first and second lateral parts of said base, respectively.

8. The optical reading head according to claim 7 wherein each said horizontal bottom planes has a guiding slot corresponding to a screw hole on said surface of said casing, and a screw is screwed into said screw hole through said guiding slot.

9. The optical reading head according to claim 1 wherein two horizontal blocks are formed on the internal walls of said first and second lateral parts of said base for supporting said sliding frame.

10. The optical reading head according to claim 9 wherein both sides of the sliding frame comprise horizontal wings and L-shaped tenons 206B corresponding to said horizontal blocks for clamping the top sides and the bottom sides of said horizontal blocks.

11. The optical reading head according to claim 1 wherein said sliding frame further comprises two horizontal wings on the bilateral sides thereof.

12. The optical reading head according to claim 11 wherein each horizontal wing has a guiding slot corresponding to a screw hole on said surface of said casing, and a screw is screwed into said screw hole through said guiding slot.

13. The optical reading head according to claim 1 wherein said sliding frame further comprises a horizontal tail plane arranged at the top side thereof, and said rear part of said base further comprises a gliding indentation on the top surface thereof, wherein said horizontal tail plane overlies said gliding indentation when said sliding frame is coupled with said base.

14. The optical reading head according to claim 13 wherein a linear recess structure is formed in the top surface of said rear part of said base, and said horizontal tail plane has a downward perforation corresponding to said linear recess structure, wherein a portion of said linear recess structure is exposed from said downward perforation when said sliding frame is mounted on said base.

15. The optical reading head according to claim 13 wherein said horizontal tail plane of said sliding frame further comprises a protrusion part extending downwardly from a terminal thereof, and said rear part of said base further comprises a transverse recess structure corresponding to said protrusion part, wherein said protrusion part is accommodated within said recess structure to limit the movable range of said protrusion part.

16. The optical reading head according to claim 1 further comprising a fixing plate under said first lateral part of said base, said fixing plate having an L-shaped hooking structure corresponding to an L-shaped guiding slot formed in said gliding channel, wherein said L-shaped hooking structure penetrates through the shorter side of said L-shaped guiding slot and is hooked on periphery of the longer side of said L-shaped guiding slot such that the bottom of said first rear part of said base is in close contact with said gliding channel.

17. The optical reading head according to claim 1 further comprising a push rod arranged in a connection portion of said base and said image sensing module, wherein said base further comprises a receptacle for accommodating said push rod.

18. The optical reading head according to claim 17 wherein said push rod further comprises a linear recess structure on the top surface thereof, and said base has a downward perforation corresponding to said linear recess structure, wherein a portion of said linear recess structure is exposed from said downward perforation after said push rod is accommodated within said receptacle.

19. The optical reading head according to claim 17 wherein the top surface of said push rod further comprises a screw hole corresponding to a guiding slot of said base, and a screw is screwed into said screw hole through said guiding slot.

20. The optical reading head according to claim 17 wherein the font side of said push rod further comprises a screw hole corresponding to a guiding slot of said image sensing module, and a screw is screwed into said screw hole through said guiding slot.

21. An optical reading head of a scanning apparatus, comprising:
a casing containing therein a light source, a plurality of reflective mirrors, and a lens;
an image sensing module including an image sensor;
a base arranged on a surface of said casing for supporting said image sensing module, the base including a receptacle therein;
a push rod accommodated within said receptacle and coupled to said image sensing module for adjusting the horizontal alignment angle of said image sensing module;
wherein said push rod further comprises a linear recess structure on the top surface thereof, and said base has a downward perforation corresponding to said linear recess structure, wherein a portion of said linear recess structure is exposed from said downward perforation after said push rod is accommodated within said receptacle.

22. The optical reading head according to claim 21 wherein the top surface of said push rod further comprises a screw hole corresponding to a guiding slot of said base, and a screw is screwed into said screw hole through said guiding slot.

23. The optical reading head according to claim 21 wherein the font side of said push rod further comprises a screw hole corresponding to a guiding slot of said image sensing module, and a screw is screwed into said screw hole through said guiding slot.

24. An optical reading head of a scanning apparatus comprising:
a casing;
an image sensing module including an image sensor;
a base arranged on a surface of the casing, wherein the image sensing module is supported by the base;
a lens movably disposed on the surface of the casing; and
a sliding frame slidably mounted to the base, the lens being captured between the sliding frame and casing, the sliding frame engaging the lens to move the lens relative to the base and casing in response to an external force, the sliding frame selectively fixable relative to the base.

25. The optical reading head according to claim 24, wherein the base comprises first and second lateral portions and wherein the sliding frame and lens are positioned between the first and second lateral portions.

26. The optical reading head of claim 24, further comprising a track formed on the casing; wherein the lens is disposed on the track.

27. The optical reading head of claim 24, further comprises a mirror oriented to reflect light into the lens.

28. The optical reading head of claim 27, wherein the base is slidably mounted to the casing.

29. A method for adjusting a reading head comprising:
in an apparatus comprising a casing having a gliding track on a surface thereof, an image sensing module including an image sensor, a base arranged on the surface of the casing, and comprising a rear part and first and second lateral parts, wherein the image sensing module is supported by the rear part, a lens movable on the gliding track, and a sliding frame disposed between the first and second lateral parts for driving the lens to move along the gliding track in response to an external force, moving the lens relative to the image sensor by actuating the base, and fixing the base relative to the casing.

30. The method of claim 29, wherein the apparatus further comprises a mirror oriented to reflect light into the lens, the method further comprising moving the base relative to the casing to change a distance between the lens and the mirror.

31. The method of claim 29, further comprising adjusting an angle of the image sensor relative to the base by actuating a push rod slidably mounted to the base and having an end of the image sensor fastened thereto.

32. The method of claim 31, wherein actuating the push rod comprises:

inserting a tool having a narrowed terminal portion eccentrically secured to a circular cross section portion into an aperture formed in the base and sized to receive the circular cross section portion such that the narrowed terminal portion engages a linear recess formed in the push rod and exposed through the aperture; and rotating the tool such that the narrowed terminal portion induces linear movement of the push rod.

33. The method of claim 29, wherein actuating the sliding frame comprises:

inserting a tool having a narrowed terminal portion eccentrically secured to a circular cross section portion into an aperture formed in the sliding frame and sized to receive the circular cross section portion such that the narrowed terminal portion engages a linear recess formed in the base and exposed through the aperture; and rotating the tool such that the circular cross section portion induces movement of the sliding frame relative to the base.

34. The method of claim 29, further comprising moving the base relative to the casing to change a distance between the lens and the mirror.

35. The method of claim 34, wherein moving the base relative to the casing comprises:

inserting a tool having a narrowed terminal portion eccentrically secured to a circular cross section portion into an aperture formed in base and sized to receive the circular cross section portion such that the narrowed terminal portion engages a linear recess formed in the casing and exposed through the aperture; and rotating the tool such that the circular cross section portion induces movement of the base relative to the casing.

36. The method of claim 35, wherein the linear recess extends transversely across a groove formed in the casing and wherein the base includes a projection slidably positioned within the groove.

* * * * *

UNITED STATES PATENT AND TRADEMARK OFFICE
CERTIFICATE OF CORRECTION

PATENT NO. : 7,604,171 B2
APPLICATION NO. : 11/235812
DATED : October 20, 2009
INVENTOR(S) : Chang Page 1 of 1

It is certified that error appears in the above-identified patent and that said Letters Patent is hereby corrected as shown below:

Column 10
Line 57, delete "comprises" and insert --comprising--

Column 11
Line 8, delete "each said" and insert --each of said--

Column 12
Line 6, delete "font" and insert --front--
Line 33, delete "font" and insert --front--
Line 56, delete "comprises" and insert --comprising--

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO.        : 7,604,171 B2                                              Page 1 of 1
APPLICATION NO.   : 11/235812
DATED             : October 20, 2009
INVENTOR(S)       : Yu-Cheng Chang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this

Fourteenth Day of December, 2010

David J. Kappos
*Director of the United States Patent and Trademark Office*